3,001,853
SYNTHETIC MAGNESIUM ALUMINUM SILICATE PRODUCT

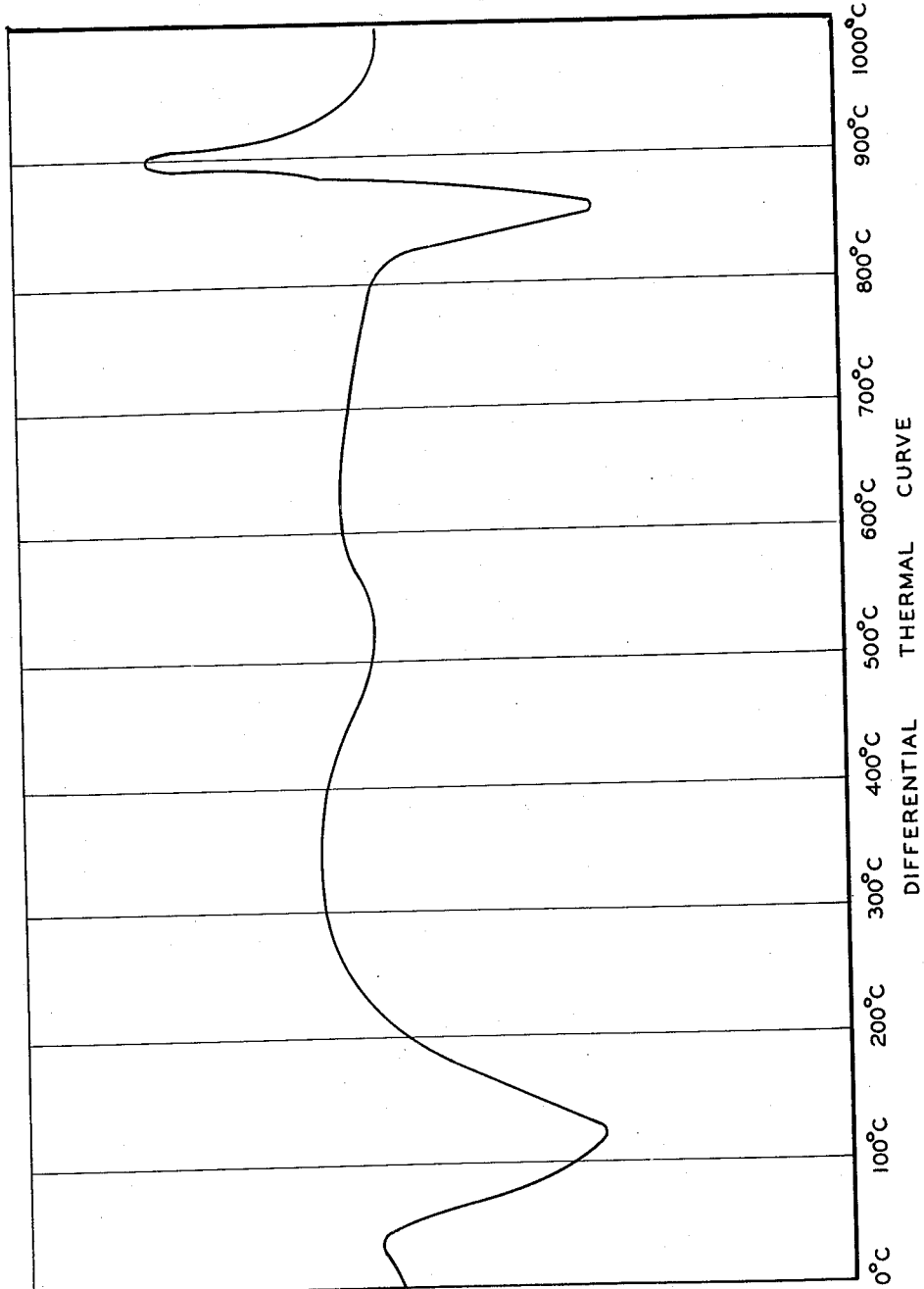

Glen Alton Hemstock, East Brunswick, N.J., assignor to Minerals & Chemicals Philipp Corporation, a corporation of Maryland
Filed Apr. 6, 1960, Ser. No. 20,310
4 Claims. (Cl. 23—112)

The present invention relates to novel crystalline hydrated magnesium aluminum silicate products and to a method of producing such products from attapulgite clay.

Attapulgite clay is an earthy material whose chief mineral constituent is the clay mineral attapulgite. Attapulgite is a crystalline, complex magnesium aluminum silicate. Electron micrographs show that attapulgite crystals are acicular or lathlike. The mineral is considered to be a hydrated magnesium silicate of the ideal formula $$8SiO_2.5MgO.4H_2O$$

in which various quantities of aluminum and sometimes iron proxy for some of the magnesium and/or silica in the lattice. The magnesium content of attapulgite is always appreciable and a typical sample of attapulgite can be represented by the approximate empirical formula $$8SiO_2.4.5MgO.0.5Al_2O_3.4H_2O$$

The mineral attapulgite, irrespective of the extent to which aluminum and iron are present, is readily distinguishable from other clay minerals by the fact that it possesses a strong d-spacing at 10.5 A. Accordingly, the term "attapulgite" as used herein encompasses those hydrated complex magnesium aluminum silicates which possess this X-ray diffraction characteristic. Attapulgite's characteristic X-ray diffraction peak at about 10.5 A. is unchanged by variations in relative humidity, by heating the mineral to about 300° C. for short periods of time or by treatment with polar organic molecules. Each of these influences produces appreciable changes in the c-axis spacing of certain layerlike clay minerals and the normally diffuse diffraction patterns of these clays reflect this fact. The clays which exhibit variations in c-axis spacing are usually referred to as "expanding lattice clays." Wyoming bentonite is a familiar example. Attapulgite is a nonexpanding lattice clay.

Attapulgite clay is mined chiefly in Georgia and in Florida. Most deposits of this clay contain small amounts of quartz, sepiolite, calcite, montmorillonite minerals, or mixtures of these minerals. A typical specimen of degritted attapulgite clay has the following analysis, on a volatile free (V.F.) clay basis:

| | Weight, percent |
|---|---|
| $SiO_2$ | 67.0 |
| $Al_2O_3$ | 12.5 |
| $MgO$ | 11.0 |
| $Fe_2O_3$ | 4.0 |
| $CaO$ | 2.5 |
| Others | 3.0 |

Volatile free clay weight is determined by heating the clay to constant weight at 1000° C. The water of crystallization of attapulgite clay is typically about 9 to 10 percent. Water of crystallization is calculated in accordance with the following equation:

$$\text{Percent water of crystallization} = \frac{L.O.I. - F.M.}{100 - F.M.} \times 100$$

The term "L.O.I." refers to the loss on ignition which is the weight loss of a representative sample of the clay upon being heated to constant weight at 1000° C. "F.M." refers to free moisture, which is the weight loss of a sample of clay upon being heated to constant weight at 105° C.

Attapulgite clay is useful in many important industrial applications, among which may be mentioned a bodying agent in the production of drilling muds and other aqueous gels, an adsorbent in the decolorization of oils, and an adsorptive carrier for insecticides and herbicides. One of the properties of attapulgite clay that is responsible for many of its uses is its high surface area. This is a factor accounting for the outstanding adsorptive properties of the clay. However, for some important applications clays other than attapulgite clay have certain superior properties.

For example, one disadvantage of naturally occurring attapulgite clay is its lack of stability at temperatures of the order of 400° C. to 600° C. When attapulgite clay is heated to such temperature, the mineral lattice is destroyed and water is evolved. The surface area of the clay is reduced somewhat when this occurs. When the clay is calcined in commercial kilns for the purpose of putting the clay into a condition suitable for use as a percolation adsorbent, local overheating sometimes takes place, with the deleterious effects noted above. Bentonite clays are somewhat more stable and do not undergo decomposition until they are heated to temperatures within the range of 500° C. to 700° C.

Also, the cation-exchange (base-exchange) capacity of attapulgite clay is low when compared with bentonite clays. For this reason bentonite clays are usually the starting clay in the production of so-called "onium clays" in which inorganic cations of a clay are replaced with the long chain organic cation of a suitable onium compound, such as a long chain amine containing nitrogen in pentavalent state. Onium clays are useful, for example, as grease-thickening agents.

Although the adsorptive properties of attapulgite clay are generally superior to those of other naturally occurring clays, an increase in surface area of the clay would enhance the utility of the clay in many of its present important applications and permit the use of the clay in fields in which certain synthetic silicate adsorbents of exceptionally high surface area are preferred.

An object of the present invention is the production of a novel claylike, complex hydrated magnesium aluminum silicate from attapulgite clay.

A particular object of the invention is the production of a novel adsorbent which is chemically similar to attapulgite clay but which has a materially higher surface area.

A further object of this invention is the provision of a novel hydrated magnesium aluminum silicate from attapulgite clay, which product is stable at temperatures which will decompose naturally occurring clays.

Still another object of this invention is the provision of a simple method of increasing the base-exchange capacity of attapulgite clay.

Further objects and advantages of my invention will be readily apparent from the description thereof which follows.

I have discovered that attapulgite clay may be converted by controlled hydrothermal treatment at superatmospheric pressure into a novel, heat-stable, hydrated magnesium aluminum silicate of improved base-exchange capacity. I have discovered, too, that a product of this character and also possessing an exceptionally high surface area, may be obtained when the starting attapulgite clay is one which was been previously calcined to an elevated temperature hereafter set forth.

Briefly stated, the novel hydrated magnesium aluminum silicate product of this invention is produced by subjecting attapulgite clay, uncalcined or calcined at temperatures not appreciably in excess of 800° C., to hydrothermal treatment under superatmospheric pressure until virtually the only phase present is an expanding lattice, hydrated magnesium aluminum silicate product; this product has a crystal structure such that a glycolated oriented specimen thereof produces a characteristic X-ray diffraction maximum in the vicinity of 17 A. The product of my invention is glycolated prior to investigation with X-radiation because its expanding lattice would give rise to a diffuse X-radiation pattern in the absence of glycolation. The water of crystallization of the novel silicate products of my invention is about 6.0 to 6.5 percent.

The differential thermal (DTA) curve of my silicate product is illustrated in the accompanying figure. The curve was obtained by conventional procedure, increasing the furnace temperature at the rate of 10° C. per minute. The DTA curve shows that the product undergoes an intense endothermic reaction at about 850° C. This reaction is believed to be associated with an abrupt water loss. The DTA curves of known naturally occurring clays and a large number of silicate minerals have been studied and none has been found to correspond with the DTA curve of the product of this invention. The DTA curve illustrated in the figure indicates that the product of my invention is thermally stable at temperatures which will destroy the lattice of known naturally occurring clays.

In accordance with a preferred embodiment of my invention, the attapulgite clay I subject to such hydrothermal treatment is one which has been previously calcined to an amorphous condition at a temperature within the limits of 600° C. to 800° C. The B.E.T. surface area of the resultant product is appreciably higher than that of naturally occurring attapulgite clay, calcined at lower temperature or uncalcined. X-ray diffraction patterns of the product obtained by treatment of such starting clay in accordance with the preferred embodiment of my invention indicate that this product is less well crystallized than the product obtained by hydrothermal treatment of uncalcined attapulgite clay or attapulgite clay which has been calcined at temperatures lower than 600° C. By way of example, the surface area of the adsorbent obtained by preferred hydrothermal treatment of attapulgite clay precalcined at 600° C. to 800° C. is 200 to 300 square meters per gram or more (as determined by the B.E.T. nitrogen adsorption method). Such surface areas are appreciably greater than those of naturally occurring clays. The B.E.T. surface areas of montmorillonite clays and kaolin clays are only of the order of 40 to 60 and 15 square meters per gram, respectively.

The product of my invention obtained from uncalcined attapulgite clay has a B.E.T. surface area of about 120 to 150 square meters per gram, somewhat less than the surface area of the starting clay. Products obtained by precalcining attapulgite clay at temperatures lower than 600° C. have been found to have surface area values intermediate between those of products obtained from uncalcined clay and clay calcined at 600° C. to 800° C. Such products, although their surface areas are less than or not appreciably greater than that of the starting clay, possess many desirable properties which represent an improvement over naturally occurring attapulgite clay. One advantage is that the base-exchange capacity of products obtained from uncalcined attapulgite clay or from attapulgite clay precalcined below 600° C. is of the order of 45 to 55 meq./100 gm. This value is higher than the base-exchange capacity of naturally occurring attapulgite clay which is typically within the range of 15 to 20 meq./100 gm. The high surface area odsorbents of this invention also have a higher base-exchange capacity than naturally occurring attapulgite clay. Also, the various products of this invention are thermally stable at temperatures which will decompose naturally occurring clays, i.e., they are thermally stable up to about 850° C.

The novel magnesium aluminum silicates of this invention are useful for those applications in which colloidal clays are useful, namely, as thickening agents in the production of aqueous drilling muds; as starting materials in the production of base-exchanged clay products such as, for example, onium clays; as solid carriers for toxicants such as, for example, malathion; and as oil decolorizing adsorbents. The high surface area products obtained in accordance with the preferred form of my invention are especially useful in the decolorization of oils and for other applications in which solid adsorbents having an affinity for polar organic molecules are utilized.

The products of this invention may be considered to be synthetic clays inasmuch as they exhibit properties normally characteristic of clays. By way of example, the products consist of colloidally dimensioned crystals, exhibit base-exchange properties and have a plastic consistency when mixed with water. However, the products differ in several respects from the large number of clayey materials reported in the literature. As mentioned, the DTA curve of the product is unique. The base-exchange capacity of the products is intermediate between the base-exchange capacities of attapulgite clay and montmorillonite clay. The B.E.T. surface area of the novel adsorbent obtained in accordance with the preferred form of my invention is appreciably higher than that of any naturally occurring clay.

In producing the novel adsorbent, the starting attapulgite clay may be the raw clay as mined which has undergone no treatment other than crushing. Preferably, the clay is refined to the extent that grit and coarse agglomerates have been removed by wet or dry methods well-known to those skilled in the art. The clay may be one which has undergone chemical treatment for decolorization, or the like, provided such treatment has not removed essential constiuents of the attapulgite lattice.

As mentioned, the starting attapulgite clay may be calcined or uncalcined. I have found that calcined clay can be converted hydrothermally to the desired expanding lattice mineral at appreciably lower steam pressure than the uncalcined clay, thereby effecting a substantial reduction in processing costs. For this reason I prefer to calcine the clay before subjecting it to hydrothermal treatment. The calcination is conducted within the range of 200° C. up to that temperature at which the characteristic attapulgite exotherm takes place (normally slightly above 800° C.). The calcination time will be sufficient to reduce the water of crystallization of the clay to within the range of somewhat less than 1 to 9 percent. Calcination periods of the order of ½ to 24 hours or more are recommended and the calcination may be conducted in air or other inert atmosphere at normal or reduced pressure.

When attapulgite is calcined above about 800° C. for a time sufficient to permit the characteristic attapulgite exotherm to take place, new phases, including spinels and enstatite, appear. The resultant product cannot be transformed into the desired novel high surface area adsorbent by hydrothermal treatment in accordance with the present invention. Especially when large quantities of attapulgite clay are calcined, difficulties may be experienced in producing a material having a water of crystallization less than 3 percent without at least a portion of the clay undergoing the attapulgite exotherm. However, when the calcining equipment and controls are such that the exotherm can be avoided, a clay which has been previously calcined to less than 1 percent water of crystallization is eminently suitable.

As mentioned, preferably the starting clay is an amorphous form of the clay which has been obtained by calcination at 600° C. to 800° C. (but below the temperature of the attapulgite exotherm). The water of crystallization of such starting clay will be from somewhat less than 1 percent to about 4 percent. Especially preferred in commercial production is attapulgite clay which has been calcined at about 700° C. to a water of crystallization of about 3 percent. The advantages of obtaining a final product of exceptionally high surface area are realized using such a starting clay. However, the danger of local formation of spinels and enstatite in the mass is less than when clay which has been calcined at more elevated temperature is employed.

In readying the starting clay for hydrothermal treatment in accordance with the present invention, I prefer to use pulverized clay particles which are 100 percent finer than 325 mesh and then form an aqueous slip of the pulverized clay. I have obtained good results forming a slip containing clay in amount of about 10 to 30 percent solids (based on the weight of the slip). No chemicals are added to the aqueous slip which consists of water and clay.

The slip is then placed in an autoclave or other suitable high pressure equipment and steam is introduced. The steam pressure, quality, and time for a starting clay of any water of crystallization are selected to produce a single phase product, a glycol oriented specimen of which produces an X-ray diffraction peak in the vicinity of 17 A. Simple experiments correlating hydrothermal conditions with the X-ray powder diffraction pattern of products of experimental runs will readily indicate when satisfactory conditions are obtained for a starting clay of a given water of crystallization. When employing a starting clay which has been calcined below about 350° C., the X-ray diffraction pattern of the glycolated hydrothermally treated product will show no 17 A. line when the steam pressure and/or time is inadequate. Clay which has been calcined at 350° C. to 450° C. tends to revert to a well-crystallized attapulgite and the X-ray pattern will show a strong 10.5 A. peak until the steam pressure is increased. Attapulgite which has been calcined from 450° C. up to the temperature at which the attapulgite exotherm takes place tends to be amorphous with inadequate hydrothermal treatment.

In carrying out the hydrothermal treatment, I prefer to employ saturated steam at pressures from 300 p.s.i.g. up to and not including the critical pressure; these pressures corresponding to temperatures of 163° C. to 375° C. At these pressures, steaming time may be as long as about a day in the case of the lower pressures or as short as a few minutes in the case of the high pressure steam. As mentioned, the water of crystallization of the starting attapulgite clay will have an effect on the pressure-time relationship in the hydrothermal treatment. In general, the greater the water of crystallization of the starting clay the higher the steam pressure that will be required for any given time. The hydrothermal treatment at elevated pressures should be discontinued when the desired product is obtained; prolonging the hydrothermal treatment will perfect the crystallinity of the product and lower its surface area; however, prolonging the treatment will have no observable effect on the water of crystallization of the product or the location of the diffraction peak of the product.

As used herein, surface area values are those obtained by a nitrogen adsorption method described by S. Brunauer, P. H. Emmett, and E. Teller in their article entitled "Adsorption of Gases in Multi-Molecular Layers," on page 309 of Journal of the American Chemical Society, vol. 60, February 1938, using the molecular size data of H. K. Livingston presented in his article entitled "Cross-Sectional Areas of Molecules Adsorbed on Solid Surfaces," on page 569, Journal of the American Chemical Society, vol. 66, April 1944. Base-exchange capacities refer to values obtained using neutral ammonium acetate. Glycolated oriented specimens were obtained by treating samples with ethylene glycol in accordance with the procedure described by W. F. Bradley in an article entitled "Diagnostic Criteria for Clay Minerals," Am. Mineral, 30, 704–713 (1945). X-ray powder diffraction patterns were obtained by standard procedures using copper K $\alpha$ radiation.

EXAMPLE I

A high surface area magnesium aluminum silicate adsorbent of the present invention was produced from pulverized degritted attapulgite clay from a deposit near Attapulgus, Georgia. The analysis of the starting clay, volatile free weight basis, was: $SiO_2$, 67.0%; $Al_2O_3$, 12.5%; MgO, 11.0%; $Fe_2O_3$, 4.0%; CaO, 2.5%; others, 3.0%. The water of crystallization of the raw clay was 9.0 percent. The raw clay was calcined at 800° C. for 1 hour in a preheated muffle furnace to a water of crystallization of 0.87 percent. The clay was cooled and added to sufficient water to produce a 30 percent solids slip. The slip was poured into a stainless steel autoclave. The autoclave was heated to the boiling point of the slip with a valve in the cover of the autoclave open to discharge all of the air from the autoclave. After the air was removed, the valve was closed and heating was continued until a saturated steam pressure of 1600 p.s.i.g. was obtained. The slip was maintained under a saturated steam pressure of 1600 p.s.i.g. for 2 hours and heating was thereafter discontinued. The autoclaved slip was dried overnight at 105° C. in a forced draft oven.

A glycolated oriented specimen of the dried autoclaved product was prepared. An X-ray powder diffraction of the glycolated specimen showed a strong maximum at 17 A.; lines characteristic of attapulgite or other crystalline phases were not present in the pattern.

A DTA curve of the product, obtained by standard procedures, was identical with that shown in the accompanying figure and is markedly different from the corresponding curve obtained from the starting material.

To illustrate the profound change in the calcined clay by the hydrothermal treatment, the water of crystallization and surface areas of the starting clay and the autoclaved product were measured. The results are summarized in Table I.

*Table I*

B.E.T. SURFACE AREA OF ATTAPULGITE CLAY BEFORE AND AFTER HYDROTHERMAL TREATMENT

| Sample | $H_2O$ Crystallization, Percent | B.E.T. Surface Area, Sq. Meters Per Gram |
|---|---|---|
| 1. Uncalcined Attapulgite Clay | 9.0 | 173 |
| 2. Attapulgite Clay Calcined at 800° C./1 hr | 0.87 | 83 |
| 3. Sample 2 Rehydrated with Saturated Steam at 1,600 p.s.i.g./2 hr | 6.5 | 246 |

These data show that the B.E.T. surface area of the hydrothermally treated calcined attapulgite clay was almost 50 percent higher than that of the raw clay and was about 300 percent higher than that of the calcined clay from which it was obtained by hydrothermal treatment.

Also shown is that the water of crystallization of the hydrothermally treated material was appreciably less than that of uncalcined attapulgite clay.

EXAMPLE II

This example illustrates that hydrothermal conditions must be selected with regard to the water of crystallization of the starting clay in order to produce the desired substantially pure hydrated magnesium aluminum silicate product of this invention. Experiments were conducted to ascertain the response to hydrothermal treatment with saturated steam at 1600 p.s.i.g. for 2 hours of samples of the attapulgite clay which had been calcined under various conditions reported in Table II. The phases present in each starting clay and in the corresponding hydrothermally treated material were investigated by X-ray diffraction procedure.

The data reported in Table II show that calcination of the present invention from uncalcined attapulgite clay. A sample of the minus 325 mesh uncalcined attapulgite clay of Example I (9.0 percent water of crystallization)

Table II

B.E.T. SURFACE AREA AND PHASES PRESENT IN CALCINED ATTAPULGITE CLAYS BEFORE AND AFTER REHYDRATION WITH SATURATED STEAM AT 1600 P.S.I.G. FOR 2 HOURS

| Calcination Conditions | Calcined Starting Clay | | | Rehydrated Calcined Clay | | |
|---|---|---|---|---|---|---|
| | $H_2O$ of Crystallization, Percent | B.E.T. Surface Area, Sq. Meters Per Gram | Principal Phases Present, A. | $H_2O$ of Crystallization, Percent | B.E.T. Surface Area, Sq. Meters Per Gram | Principal Phases Present (X-ray Diffraction Maxima of Glycolated Oriented Specimen), A. |
| Uncalcined Clay | 9.0 | 175 | s 10.5 | | | |
| 100° C./1 hr | 9.0 | 173 | s 10.5 | 7.4 | 136 | s 10.5 |
| 200° C./1 hr | 9.0 | 172 | ms 10.5 | 8.2 | 134 | s 10.5 |
| 300° C./1 hr | 8.5 | 174 | w 10.5 | 7.9 | 139 | ms 10.5 |
| 400° C./1 hr | 3.8 | 143 | w 10.5 | 8.4 | 138 | ms 10.5 |
| 500° C./1 hr | 3.8 | 126 | amorphous | 6.7 | 161 | vw 17 |
| 600° C./1 hr | 3.8 | 115 | amorphous | 6.1 | 186 | w 17 |
| 700° C./1 hr | 3.0 | 114 | amorphous | 6.0 | 219 | ms 17 |
| 800° C./1 hr | 0.87 | 83 | amorphous | 6.5 | 246 | s 17 |
| 900° C./1 hr | | 17.2 | spinels, enstatite.[1] | 7.50 | 0.55 | |
| 1000° C./1 hr | | 0.6 | spinels, enstatite.[1] | | 0.40 | |

[1] Attapulgite exotherm took place.
w—weak.
vw—very weak.
s—strong.
ms—moderately strong.

temperature varies inversely with the water of crystallization of the clay and that with increasing calcination temperature above 300° C. the attapulgite clay tends toward the formation of an amorphous material which has a lower surface area than attapulgite. When attapulgite is calcined above 900° C. it is transformed into new crystalline phases.

The data shows also that the response to hydrothermal treatment of calcined attapulgite clay is directly influenced by the water of crystallization of the clay that is subjected to the treatment. Hydrothermal treatment at 1600 p.s.i.g. for 2 hours converted those clays which had been calcined at relatively low temperatures of 100° C. to 300° C. and still retained the attapulgite crystalline structure into products which had a lower surface area than the starting calcined clay and a somewhat lower water of crystallization; the hydrothermal treatment under these conditions had no appreciable effect on the phases present. Clay calcined at 400° C. was unique in that this amorphous starting material responded to saturated steam at 1600 p.s.i.g. for 2 hours by undergoing an appreciable increase of water of crystallization and forming a well-crystallized attapulgite. When amorphous clay which had been calcined at 600° C. to 800° C. was bombed with saturated steam at 1600 p.s.i.g. for 2 hours it tended to form a unique crystalline phase characterized by: a strong peak at 17 A. (for a glycolated oriented specimen); a surface area which is appreciably higher than any of the products containing the crystalline attapulgite; and a water of crystallization of about 6.5 percent. The data further show that when hydrothermal treatment is carried out at a saturated steam pressure of 1600 p.s.i.g. for 2 hours, the optimum condition for producing the high surface area product of the invention is attained when the starting material is an amorphous form of attapulgite which has been calcined at 800° C. and is free of enstatite, spinels, or other crystalline phases.

EXAMPLE III

This example illustrates the production of a product was made into a 30 percent solids aqueous slurry. The slurry was placed in the stainless steel autoclave referred to above. The autoclave was evacuated and saturated steam developed. The contents of the autoclave were maintained under a saturated steam pressure of 2500 p.s.i.g. for 3 hours. The resultant product had substantially the same DTA as the product of Example I. The only crystalline phase present in the product was one having a 17 A. peak (glycolaed oriented specimen). The 17 A. peak of the glycolated oriented specimen was stronger than that of the product of Example I, indicating a more perfectly crystallized structure. The B.E.T. surface area of the product was 150 square meters per gram.

EXAMPLE IV

Various physical properties of a product of the invention were measured. This product was produced in accordance with the techniques described under Example I by autoclaving a 30 percent aqueous slip of attapulgite clay which had been calcined at 700° C. for 1 hour with saturated steam at 1600 p.s.i.g. for 2 hours.

Also determined were comparable physical properties of the starting clay which had been calcined at 700° C. for 1 hour.

Physical properties of these two materials are reported in Table III.

Table III

COMPARATIVE PHYSICAL PROPERTIES OF CALCINED ATTAPULGITE CLAY BEFORE AND AFTER HYDROTHERMAL TREATMENT

| | Attapulgite Calcined at 700° C./1 hr. | Attapulgite Calcined at 700° C./1 hr. and Rehydrated at 1600 p.s.i.g./2 hrs. |
|---|---|---|
| Base-exchange Capacity, meq./100 gm | 10 | 47 |
| Pore Volume cc./gm | 0.273 | 0.401 |
| Oil Adsorption No | 103 | 81 |
| Methylene Blue Adsorption, mg./gm | 18 | 10 |
| pH (20% suspension) | 6.5 | 6.8 |

These data show that important physical properties of the calcined clay were significantly affected by the hydrothermal treatment. The high base-exchange value of the rehydrated material indicates that when base-exchanged with sodium ions the material may be used in producing thixotropic aqueous systems, such as drilling muds. The low oil adsorption value of this material indicates that it is more useful than the starting clay as a filler in paints, plastics, and rubber. The change in methylene blue adsorption value and pH are further evidence that profound changes in the morphology of the starting clay have occurred during hydrothermal treatment.

I claim:

1. A novel adsorbent material which comprises a colloidal complex hydrated magnesium aluminum silicate having a water of crystallization of 6.0 to 6.5 percent, a V.F. analysis substantially the same as attapulgite clay, and is further characterized by undergoing an intense endothermic reaction at about 850° C. and having a crystal structure such that a glycolated oriented specimen thereof gives an X-ray diffraction peak in the vicinity of 17 A.

2. A synthetic swelling clay comprising a substantially pure colloidal complex magnesium aluminum silicate having a water of crystallization of 6.0 to 6.5 percent, a V.F. analysis substantially the same as attapulgite clay, a B.E.T. surface area of at 200 square meters per gram, and is further characterized by undergoing an intense endothermic reaction at about 850° C. and having a crystal structure such that a glycolated oriented specimen thereof gives an X-ray diffraction peak in the vicinity of 17 A.

3. A novel adsorbent comprising an expanding lattice, colloidal, complex hydrated magnesium aluminum silicate having a water of crystallization within the limits of 6.0 to 6.5 percent and the following approximate chemical analysis, on a volatile free (V.F.) clay basis:

| | Weight percent |
|---|---|
| $SiO_2$ | 67.0 |
| $Al_2O_3$ | 12.5 |
| MgO | 11.0 |
| $Fe_2O_3$ | 4.0 |
| CaO | 2.5 |
| Others | 3.0 | said adsorbent being further characterized by undergoing an intense endothermic reaction at about 850° C. and having a crystal structure such that a glycolated oriented specimen thereof gives an X-ray diffraction peak in the vicinity of 17 A.

4. A novel adsorbent comprising a colloidal, expanding lattice, complex hydrated magnesium aluminum silicate having a surface area of about 200 to 300 square meters per gram, a water of crystallization within the limits of 6.0 to 6.5 percent and the following approximate chemical analysis, on a volatile free (V.F.) clay basis:

| | Weight percent |
|---|---|
| $SiO_2$ | 67.0 |
| $Al_2O_3$ | 12.5 |
| MgO | 11.0 |
| $Fe_2O_3$ | 4.0 |
| CaO | 2.5 |
| Others | 3.0 | said adsorbent being further characterized by undergoing an intense endothermic reaction at about 850° C. and having a crystal structure such that a glycolated oriented specimen gives an X-ray diffraction peak in the vicinity of 17 A.

References Cited in the file of this patent

UNITED STATES PATENTS

| 1,275,705 | Laird | Aug. 13, 1918 |
| 2,698,305 | Plank et al. | Dec. 28, 1954 |

UNITED STATES PATENT OFFICE
CERTIFICATE OF CORRECTION

Patent No. 3,001,853 September 26, 1961

Glen Alton Hemstock

It is hereby certified that error appears in the above numbered patent requiring correction and that the said Letters Patent should read as corrected below.

Column 2, line 66, for "was" read -- has --; column 3, line 72, for "odsorbents" read -- adsorbents --; column 8, line 44, for "glycolaed" read -- glycolated --; column 9, line 27, before "200" insert -- least --.

Signed and sealed this 19th day of June 1962.

(SEAL)
Attest:

ERNEST W. SWIDER
Attesting Officer

DAVID L. LADD
Commissioner of Patents